May 3, 1960  J. THYER  2,934,798
WINDOW UNIT CONSTRUCTION AND METHOD OF MAKING SAME
Filed July 26, 1957  5 Sheets-Sheet 1
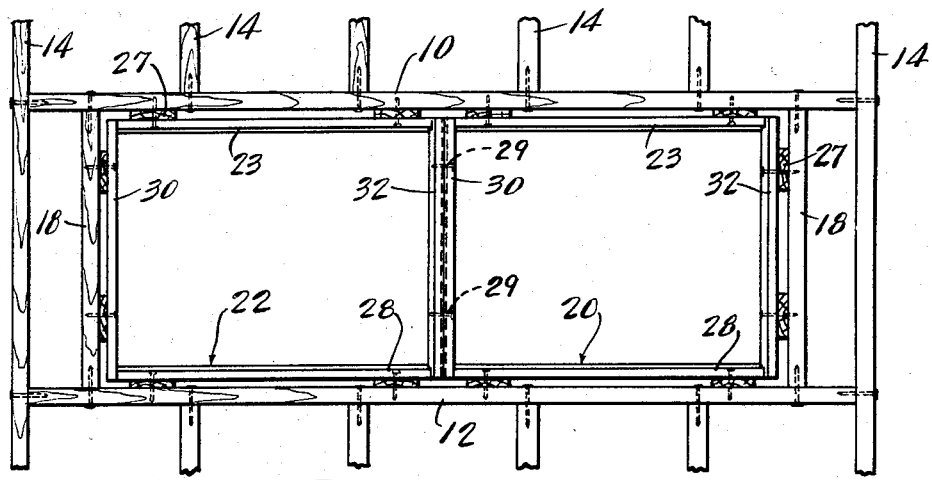
FIG-1-
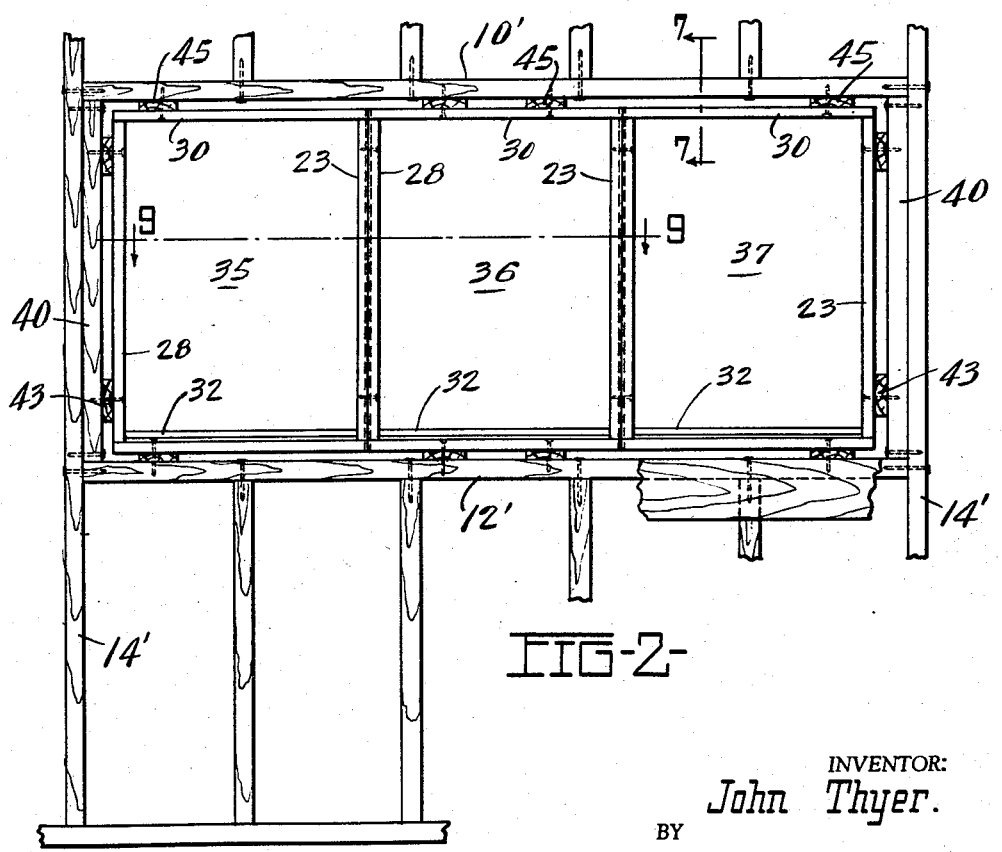
FIG-2-
INVENTOR:
John Thyer.
BY
Harry O. Ernsberger
ATTY.

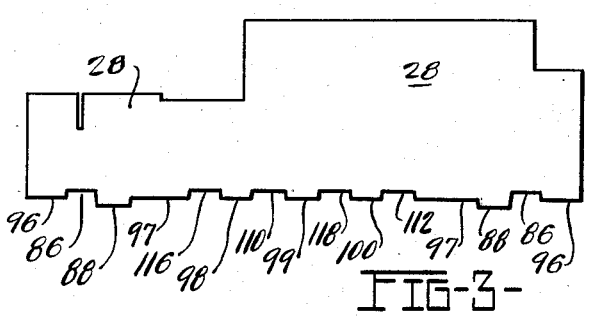
FIG-3-
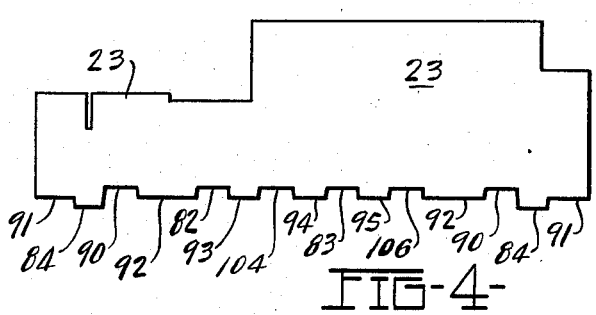
FIG-4-
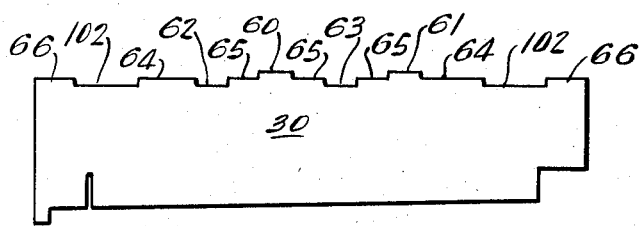
FIG-5-
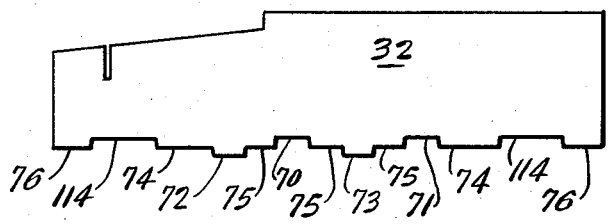
FIG-6-
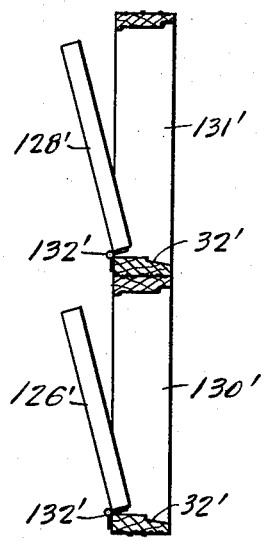
FIG-17-
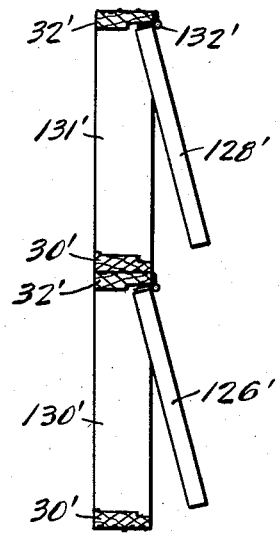
FIG-18-

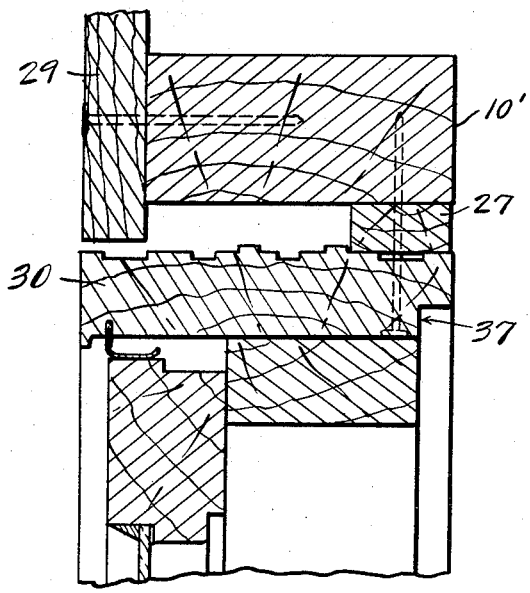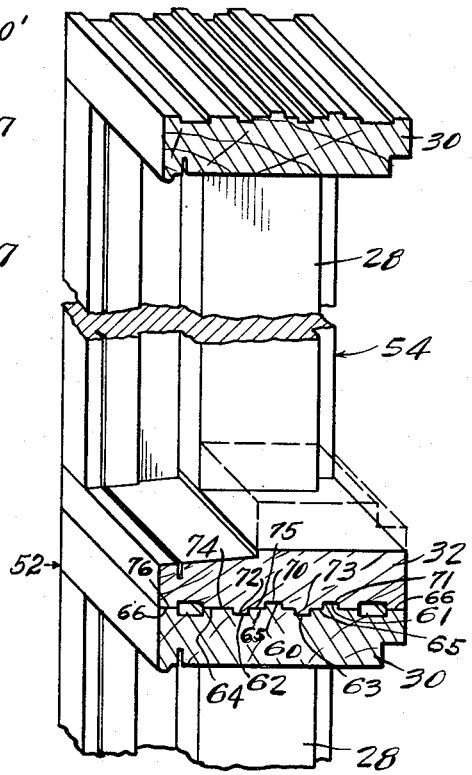

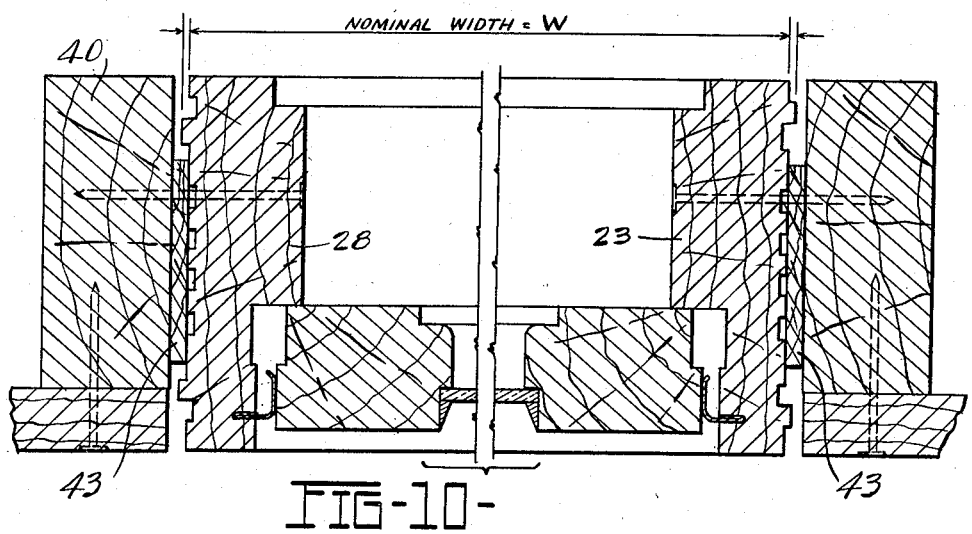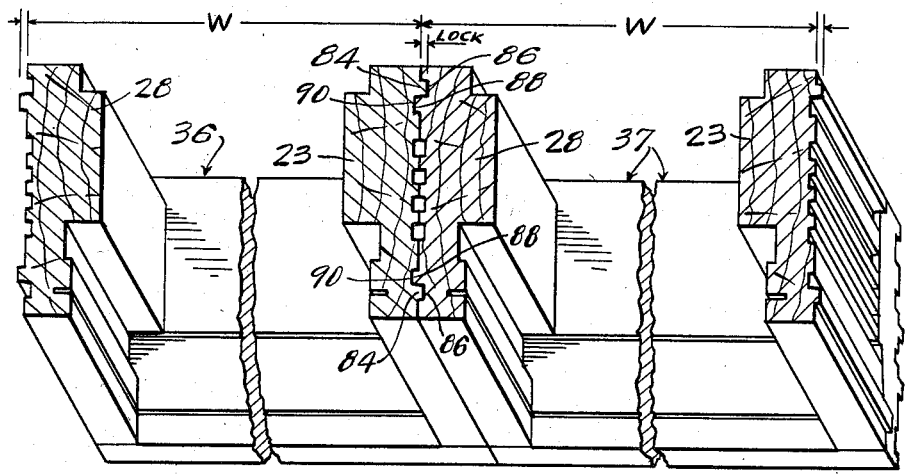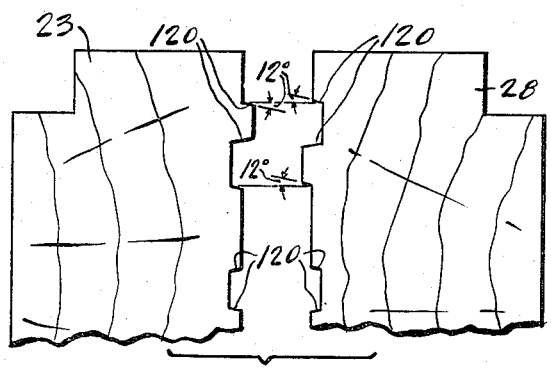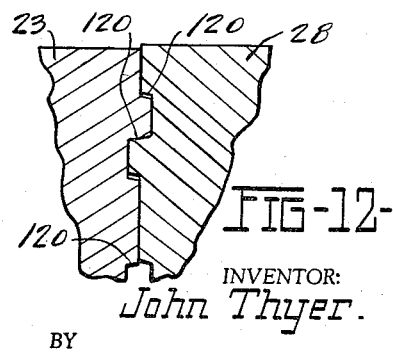

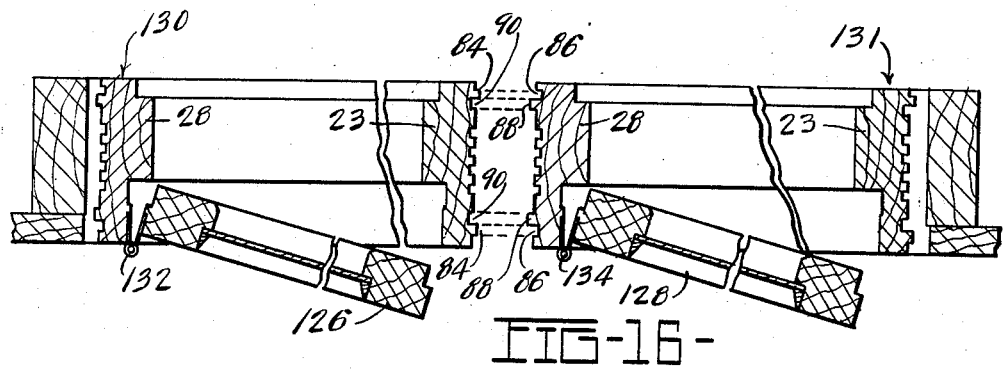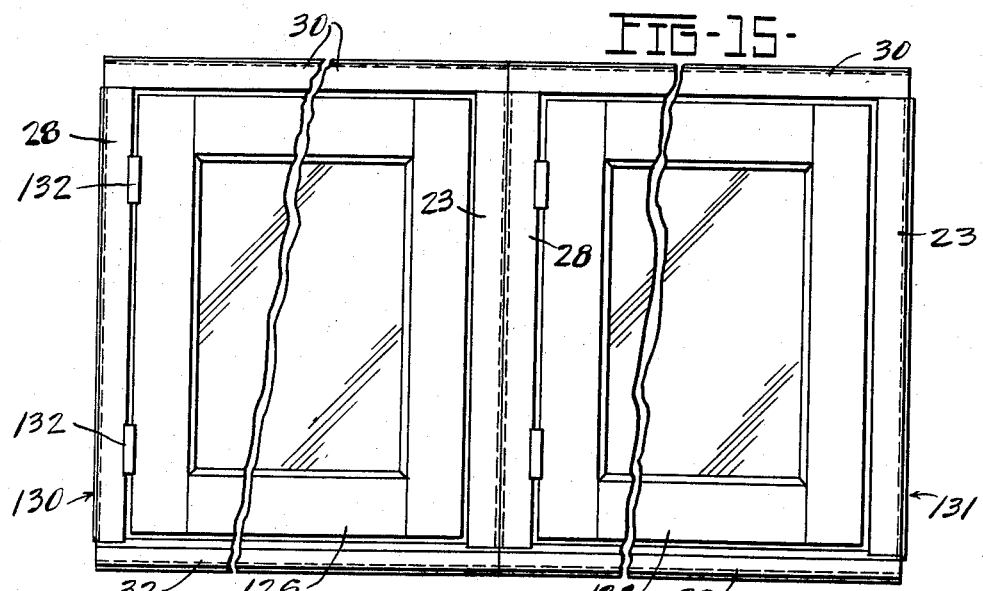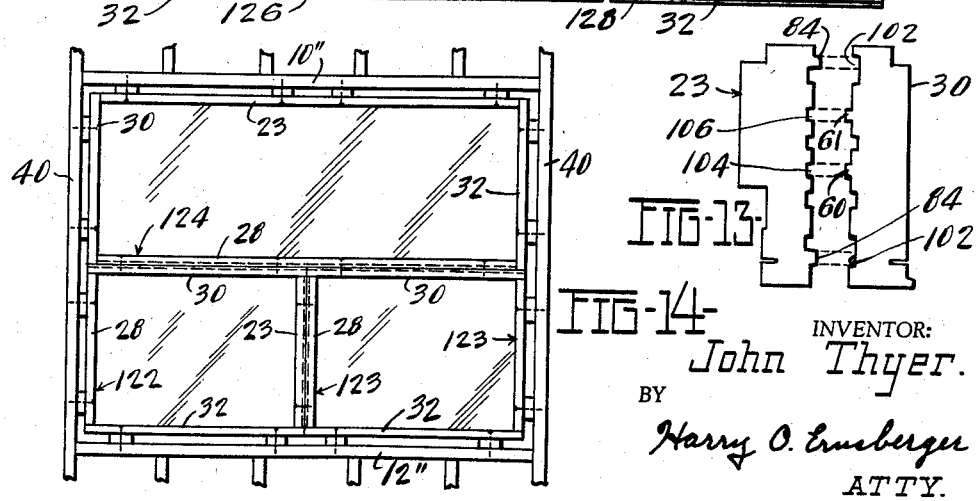

United States Patent Office 2,934,798
Patented May 3, 1960

2,934,798
WINDOW UNIT CONSTRUCTION AND METHOD OF MAKING SAME

John Thyer, Toledo, Ohio

Application July 26, 1957, Serial No. 674,362

2 Claims. (Cl. 20—11)

This invention relates to window units or constructions and mountings therefor and more especially to an arrangement and method of establishing an interlock between adjacent components of sash framing whereby to facilitate the orientation or stacking of sash frame constructions especially adapted in fabricating or forming multi-window units.

It has been a recent practice in the building industry to arrange two or more sash frame constructions in abutting or stacked relation to obtain a large amount of light admitting area in a wall construction. The aligning of several sash frames requires considerable skill and is a time consuming operation. It has been proposed to form a single groove in each of abutting wood components of sash frames and employ a separate key or feather in the mating grooves. This construction has been found to be unsatisfactory as it requires the use of an independent key member or feather rendering it very difficult to maintain keys in the grooves where several sash frames are to be assembled into one unit.

The present invention embraces a method of fabricating the wood components of sash frame constructions with tongue and groove configurations which facilitate assembling several sash frames in adjacent abutting relation without the use of separate aligning members or keys.

The invention has for an object the provision of a method of recessing or grooving the outer surfaces of the sides or jambs, sill and head of a sash frame whereby several sash frames may be arranged in stacked assembly with the frames arranged in horizontal abutting relation, vertical abutting relation or various combinations of horizontally and vertically disposed frames in direct abutting relation whereby to secure perfect alignment and interlocking of the several frames.

Another object of the invention resides in the provision of a sash frame construction for casement type or pivotally hung window sash wherein the wood components of the sash frame have lateral edge regions formed with recesses and projections of reciprocal character whereby to enable the abutting or stacking of two or more sash frames in aligned condition so that the interjacent configurated regions of the sash frame are interlocked through the cooperative relation of certain of the tongues or projections of one component extending into recesses or grooves of a component of an adjacent sash frame whereby several sash frames are maintained in proper assembled relation.

Another object of the invention resides in the formation of rectangularly shaped frames wherein the peripheral regions of the jambs, sill and head are each configurated with a particular pattern of spaced grooves and projections whereby certain of the configurated surface regions of a component mate with certain configurated surface regions of adjacent frames whereby to enable the interlocking of a plurality of frames in aligned relation irrespective of the particular frame surfaces brought into engaging or abutting relation so as to facilitate the stacking or assembly of several frames in horizontal or vertical positions or in various combinations of horizontal or vertical positioning.

Another object of the invention resides in a method of interlocking adjacent sash frame constructions of pivotally hung sash whereby the sash may be assembled for hinged movement upwardly or downwardly of the pivotal axes so that either type of window installation may be had without any modification of interengaging surface regions of the sash frames.

Another object of the invention resides in imparting particular tongue and groove configurations to components used for fabricating the jambs, sills and heads of sash frames which components may be readily cut to length for various sizes of window sash and thus effectively reducing to a minimum the number of finished sash frames normally carried in stock by a manufacturer.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view illustrating two window sash frame constructions incorporating the invention disposed in horizontal end to end relation;

Fig. 2 is an elevational view illustrating an assembly of three window sash frame constructions embodying the invention arranged in vertically disposed transverse abutting relation;

Figure 3 is a sectional view of the configuration of a left jamb or side of a sash frame particularly showing the tongue and groove pattern or arrangement;

Figure 4 is a sectional view similar to Figure 3 illustrating the tongue and groove pattern or configuration of the right jamb or side of a sash frame;

Figure 5 is a sectional view showing the arrangement of tongue and groove configuration on the head member of a sash frame;

Figure 6 is a sectional view of a sill member of a sash frame illustrating the tongue and groove configuration on the outer edge surface;

Figure 7 is a detail sectional view taken substantially on the line 7—7 of Figure 2;

Figure 8 is a fragmentary isometric sectional view showing two sash frame constructions in vertically stacked relation;

Figure 9 is a fragmentary isometric sectional view taken substantially on the line 9—9 of Figure 2 showing the method of interlocking or aligning the juxtaposed sides of adjacent sash frames;

Figure 10 is a sectional view through a single sash showing the method of installing and supporting the sash frame jambs in a support;

Figure 11 is an enlarged view showing in detail the specific shape of the grooves and projections;

Figure 12 is a sectional view showing in detail one region of the projection and groove interlock between adjacent sash frames;

Figure 13 is a diagrammatic sectional view illustrating the interlocking of tongue and groove configurations of a side member and head member of a sash frame;

Figure 14 is an elevational view illustrating three sash frames assembled in horizontal and vertical abutting relation forming a three light panel or unit;

Figure 15 is an elevational view showing casement type or pivotally hung windows with the sash frames in abutting relation;

Figure 16 is a semi-diagrammatic horizontal sectional view showing the correlation of adjacent side members of sash frames of pivotally hung windows;

Figure 17 is a semi-diagrammatic vertical sectional view showing the arrangement of interlock of stacked frames with the sash pivoted at their lower edges and arranged for swinging movement outwardly and downwardly;

Figure 18 is a view similar to Figure 17 showing the pivoted sash and sash frame constructions in inverted relation whereby the sash may be swung outwardly and upwardly;

Figure 19 is a diagrammatic sectional view of a head of a sash frame and left side or jamb in adjacent relation illustrating the tongue and groove configurations for interlocking engagement;

Figure 20 is a diagrammatic sectional view of a sill of a sash frame and right side or jamb in adjacent relation illustrating the tongue and groove configurations for interlocking engagement; and Figure 21 is a diagrammatic sectional view of a sill of a sash frame and left side or jamb in adjacent relation illustrating the tongue and groove configurations for interlocking engagement.

While the invention has particular utility in connection with window sash and sash framing, it is to be understood that use of the invention is contemplated for aligning various types of rectangular structural units wherever the same may be found to be applicable.

Referring to the drawings in detail and initially to Figure 1, there is illustrated a unit or assembly of two sash frames mounted in supporting studding, the adjacent ends of the sash frames being interlocked or aligned through the arrangement of the invention hereinafter described.

The sash frame arrangement shown in Figure 1 is mounted in a two by four buck which includes upper and lower members 10 and 12 supported by vertical studding 14. The outer ends of the sash frame are mounted between uprights or studs 18. The sash frames 20 and 22 are disposed horizontally in end-to-end relation with the head 30 of sash frame 20 being in interlocking engagement with the sill 32 of the sash frame 22. Spacing blocks or wedges 27 position the sash frames in the wall construction. The left jambs or side members 28 are arranged adjacent the support 12 and the right jambs or sides 28 are positioned adjacent the upper member 10 of the wall construction. The adjacent head 30 and sill 32 may be secured together by nailing indicated at 29 or by other suitable means.

Figure 2 illustrates a sash frame assembly wherein three frames 35, 36 and 37 are arranged in vertical position with adjacent sides or jambs of the sash frames in interlocking aligned relation through the tongue and groove arrangement of the invention. Adjacent the jambs of the outer sash frames 35 and 37 are upright studs 40. Spacing or wedge blocks 43 between the outer sash frames and the studs 40 and spacing blocks 45 between the heads of the frames and the header bar 10' hold the sash against movement. The adjacent sides or jambs 23 and 28 of the sash frames are joined by interlocking tongue and groove configurations hereinafter described.

The method and arrangement of the invention includes a particular tongue and groove configuration formed on each component of a sash frame to facilitate the assembly and stacking of several frames in vertical or horizontal relation or to enable the assembly or stacking of several sash frames with adjacent portions of the frames in interlocked relation where one or more of the frames are horizontal and others in vertical relation in a unit and irrespective of the number of frames in a unit or assembly for wall installation.

Figures 3 through 6 illustrate the forms or patterns of tongue and grooving provided on the four components of a sash frame. Figure 3 is a section through the left jamb or side 28 of a sash frame illustrating one configuration of groovings and projections.

Figure 4 illustrates the right side jamb or component 23 and its particular configuration of grooves and projections. Figure 5 is a sectional view of the head or upper member 30 of a sash frame illustrating its particular groove and projection configuration for interlocking cooperation with components of other sashes. Figure 6 illustrates a sill 32 of a sash frame formed with a particular configuration of grooves and projections for interlocking cooperation with components of adjacent sash frames.

Figures 7 and 10 illustrate in detail the mounting of a sash frame construction of the invention in a two-by-four buck or sash receiving opening in a wall construction. Figure 7 illustrates the method of securing the head 30 of a sash frame 37 in place in a wall construction. A header member 10' of the wall construction is spaced above the head 30 and a wedge or filler block 27 is interposed between the head of the sash frame 30 and the header member 10'. A facing strip 29 may be nailed to the header member 10' and the sash frame nailed through the filler block 27 as shown in Figure 7.

Figure 10 illustrates the mounting of right and left jambs of a single sash construction or multiple sash frames arranged in side-by-side relation. The left jamb 28 of the sash frame is slightly spaced from a vertical stud 40 and a wedge block 43 disposed between the exterior tongue and grooved surface of the jamb 28 and the stud 40. The jamb 28 may be secured by nailing through the wedge block into a studding as shown in Figure 10.

The right jamb or side member 23 is slightly spaced from the right vertical studding 40 as viewed in Figure 10, and a wedge or filler block 43 inserted between the jamb and the studding. The right jamb of the sash frame may be nailed in position in the same manner as the left jamb.

Figure 8 illustrates the interlocking of two sash frames in vertically aligned superposed relation. As illustrated, a lower sash frame construction 52 supports an upper sash frame unit 54. The heads 30 of the upper and lower sash units have identical tongue and groove constructions. The left side jambs or components 28 may be engaged with other sash constructions (not shown) and interlocked therewith in the manner hereinafter described. The sill 32 of the uppermost sash 54 is interengaged with the tongue and groove configuration of the head 30 of the lower frame 52 to prevent lateral shifting or misaligned relation between the sash frames.

In the arrangement shown in Figure 8, the projections or tongues 60 and 61 of the upper surface of the head 30 mate with or extend into grooves or recesses 70 and 71 respectively of the sill 32. The projections 72 and 73 of the sill 32 extend into or mate with recesses 62 and 63 of the head 30. The surfaces 74 of the sill 32 abut the surfaces of projections 64 on the head 30 as shown in Figure 8. The surfaces 65 and 66 of the head 30 abut respectively the surfaces 75 and 76 formed on the sill 32.

Thus, as shown in Figure 8, the projection 72 mating with recess 62, projection 73 mating with recess 63 and projection 60 mating with recess 70 function to properly align the window sash 52 and 54.

Figure 9 is illustrative of the interlocking of window sash frames when the same are placed in side-by-side relation as in Figure 2 with the right side component 23 of one sash 36 interlocked with the left side component 28 of sash 37.

With particular reference to Figures 3, 4 and 9, the engaging or mating recesses or grooves with tongues or projections is as follows: The projections 84 on the right side jamb or member 23 mate with recesses 86 formed on the left side jamb or member 28. The projections 88 on the left side jamb 28 mate with recesses or grooves 90 on the right member or jamb 23. Thus, as shown in Figure 9, the projections 84 extending into recesses 86 and projections 88 extending into recesses 90 maintain the sash frames in proper alignment. The surface regions 91, 92, 93, 94 and 95 of the right jamb 23 shown in Figure 4 engage respectively the surfaces 96, 97, 98, 99 and 100 of the left jamb 28 shown in Figure 3.

Figure 13 is illustrative of the mating of a right side or jamb 23 with the head member 30, a condition which obtains when a vertically disposed sash is associated with a horizontally disposed sash where the head of the horizontally disposed sash must interlock with a right jamb of the adjacent sash.

With particular reference to Figures 4, 5 and 13, the mating of interlocking projections and recesses is as follows: The projections 84 on the right side jamb 23 extend into recesses 102 on the head member 30. The projection 60 extends into recess 104 on the right jamb 23 and projection 61 on the head 30 extends into the recess 106 on the jamb 23 to establish an interlock between components 23 and 30 when these components, shown in Figure 13, are moved into engaging relation.

Figure 19 is illustrative of the interlocking relation when the head 30 of a sash frame is in engaging relation with a left side member or jamb 28 of a frame, a condition which obtains when a horizontally disposed sash is at the left side of a vertically disposed sash. The interengaging or mating of recesses and projections of the head 30 with the left side member 28 of a sash is as follows: With particular reference to Figures 3, 5 and 19, projections 88 on the left side jamb 28 extend into recesses 102 on the head 30. The projection 60 on head 30 mates with recess 110, and projection 61 on head 30 mates with recess 112 on the left jamb 28. In this manner the head 30 of one sash frame in contact with the left side jamb of another frame maintain the sash frames in interlocked aligned relation.

Figure 20 illustrates a sill of one sash frame disposed in relation to be interlocked and aligned with the right side member 23 of an adjacent sash frame. With particular reference to Figures 4, 6 and 20, the intermeshed or mating recesses and projections of the sill 32 in juxtaposed relation with a right side jamb 23 is as follows:

The projections 84 on the right jamb 23 extend into recesses 114 on the sill 32, projection 72 on the sill 32 extends into recess 82 on the right side jamb 23 and projection 73 on the sill extends into or mates with recess 83 on the jamb 23. In this manner a sill member of a sash frame abutted with a right side jamb 23 of an adjacent frame are interlocked in the manner described to maintain the frames in aligned relation.

Figure 21 illustrates the relation of projections and recesses arranged for interengaging relation when a sill 32 of one sash frame is to be engaged with a left side jamb 28 of an adjacent frame. In this relation the intermeshing or interlocking projections and recesses are as follows: The projections 88 on the left side jamb 28 of a sash frame mate with or extend into recesses 114 in the sill 32, projection 72 on the sill 32 extends into recess 116 in the left side member 28 and projection 73 on the sill 32 extends into recess 118 formed in the left side member 28.

In this manner a sill 32 of one sash abutted against a left side member 28 of an adjacent sash will be held in interlocked aligned relation. This arrangement of sash members obtains when a horizontally disposed sash frame with the sill in vertical relation is assembled with the left side of a vertically disposed sash frame.

All of the transverse walls or edges of the projections and recesses formed in all of the sash frame components 23, 28, 30 and 32 are chamfered at approximately a 12° angle as shown at 120 in Figures 11 and 12 so as to facilitate interengagement or mating of projections with recesses in the manner shown in Figure 12.

The chamfering is dimensioned to not only facilitate mating the adjacent components of sash frames during installation but also permits slight transverse adjustment of one sash with respect to an adjacent sash to compensate for any slight wear of the grooving knives which form the recesses or grooves and tongues in the components of a sash frame. Figure 12 is illustrative of the relative slight transverse movement that may be had between components of adjacent sash frames to obtain an accurate planar alignment of frames in stacked or interengaging relation.

Figure 14 is illustrative of an assembly of two vertically arranged sash frames 122 and 123 with right and left jambs thereof in interengaging relation upon which is stacked a horizontally disposed frame 124. In this assembly, the heads 30 of both frames 122 and 123 are in interlocking engagement with the left jamb 28 of the frame 124. The unit is mounted in a two by four buck provided by vertical studding 40, sill support 12″ and header 10″ of a wall construction.

Figures 15 and 16 illustrate a pair of swingable window constructions, each of which is pivotally supported in a sash frame, the components of each sash frame or unit being provided with grooved configurations of the character hereinbefore described for aligning and interlocking the adjacent components of the sash frames. The arrangement shown in Figures 15 and 16 illustrates the sash arrangement wherein the movable windows pivot about vertical axes and swing in the same directions as illustrated in Figure 16.

As illustrated, the sash frame arrangement for the pivotally supported windows of Figure 16 are adapted to be abutted so that the right side of the left sash frame engages the left side of the right sash frame, the grooves and recesses of the adjacent right and left components are interlocked in the manner shown in Figure 9.

The construction illustrated in Figures 15 and 16 include adjacent pivotally supported windows or window units 126 and 128 which are respectively supported in sash frame constructions 130 and 131, these sash frame constructions being identical. The window sash 126 is pivotally supported by means of hinges 132 to the left side component 28 of sash frame 130, and the window 128 is pivotally supported by means of hinges 134 to the left side jamb or member 28 of the sash frame construction 131.

Figure 17 is illustrative of window and sash frame constructions of the character illustrated in Figures 15 and 16 when disposed in horizontal position with the hinges 132′ connecting the sash 126′ and 128′ with the adjacent rectangularly shaped sash units 130′ and 131′. In the arrangement shown in Figure 17, the sill 32′ is at the bottom of the sash unit and the hinges 132′ are secured to the sills. Any number of sash unit assemblies may be stacked in a vertical direction as shown in Figure 17.

With the arrangement shown in Figure 17 the window sash units 126′ and 128′ are swung inwardly into the interior of the room or building so as to provide for ventilation of the room, with the windows angularly inclined downwardly to deflect rain onto the sill members 32′ for discharge exteriorly of the room or building. Means of conventional character (not shown) may be provided for mechanically opening and closing the pivoted window sash constructions 126′ and 128′.

Figure 18 illustrates a stacked window sash arrangement similar to Figure 17 but with the window sash in inverted condition with respect to their pivotal axes. In Figure 18, the windows 126′ and 128′ are pivoted through the hinge members 132′ with the sills 32′, the heads 30′ being the lowermost members in the unit or assembly. Thus, in this arrangement of stacked sash frame constructions the windows 126′ and 128′ are arranged to be swung outwardly and upwardly to an open position as shown in Figure 18. The projections and recesses of the adjacent sill 32′ and head 30′ mate in the manner illustrated in Figure 8 to establish an interlocking connection between the sash frames 130' and 131' to maintain an aligned condition of the sash frames during and after installation in a wall.

While the arrangement shown in Figure 18 portrays two sash frames in stacked relation, it is to be understood that any number of sash frames may be arranged in the relation shown in Figure 18.

The arrangement of the invention facilitates the assemblage or stacking of a plurality of window sash frames in many different combinations as indicated herein. A combination of horizontally disposed and vertically disposed window sash frames may be incorporated in a light transmitting unit of practically any dimension for a building.

It is apparent that, within the scope of the invention, modifications and different arrangements may be made other than is herein disclosed, and the present disclosure is illustrative merely, the invention comprehending all variations thereof.

I claim:

1. A sash frame construction of the character disclosed including side members each formed with a pair of longitudinal grooves in spaced relation and a coextending longitudinal tongue forming a side wall of each of the grooves, said side members being formed with at least four additional grooves and a second tongue, a head member and a sill member joining the side members, the exterior transverse surfaces of each of said head and sill members having at least two longitudinally extending tongues and a plurality of grooves, at least two of the grooves in each of the head and sill members being of greater width than the width of the tongues on any of said members, the tongues and grooves on each of the members being arranged whereby at least two tongues on one member project into and interlock with grooves of a member of an adjacent sash frame of like character when two or more sash frames are arranged in aligned stacked relation.

2. A sash frame construction of the character disclosed including side members each formed with a pair of longitudinal grooves in spaced relation and a coextending longitudinal tongue forming a side wall of each of the grooves, said side members being formed with at least four additional grooves and a second tongue, a head member and a sill member joining the side members, the exterior transverse surfaces of each of said head and sill members having at least two tongues and a plurality of grooves, at least two of the grooves in each of the head and sill members being of greater width than the width of the tongues on any of said members, the tongues and grooves on each of the members being arranged whereby at least two tongues on one member project into and interlock with grooves of a member of an adjacent sash frame of like character when two or more sash frames are arranged in aligned stacked relation, each of said members being formed with at least two longitudinally extending flat surfaces arranged for abutting engagement with like surfaces on members of adjacent frames, the top surfaces of the tongues and the root surfaces of the grooves of each of the members being in parallel relation.

References Cited in the file of this patent

UNITED STATES PATENTS

| | | |
|---|---|---|
| 2,132,757 | Paulson | Oct. 11, 1948 |
| 2,810,941 | Mainieri | Oct. 29, 1957 |

FOREIGN PATENTS

| | | |
|---|---|---|
| 491,750 | Great Britain | Sept. 8, 1938 |